United States Patent [19]

Drynan et al.

[11] Patent Number: 4,617,657
[45] Date of Patent: Oct. 14, 1986

[54] TRANSMITTING SEQUENCE NUMBERS OF INFORMATION IN A PACKET DATA TRANSMISSION SYSTEM

[75] Inventors: David S. Drynan; David M. Baker, both of Ottawa, Canada

[73] Assignee: Northern Telecom Limited, Montreal, Canada

[21] Appl. No.: 688,110

[22] Filed: Dec. 31, 1984

[51] Int. Cl.$^4$ ............................................. H04Q 11/04
[52] U.S. Cl. ......................................... 370/60; 370/94
[58] Field of Search ...................... 370/94, 60, 85, 104; 371/35

[56] References Cited

U.S. PATENT DOCUMENTS 4,009,344  2/1977  Flemming ........................... 370/104
4,344,171  8/1982  Lin et al. ............................. 371/35
4,536,874  8/1985  Stoffel et al. ......................... 370/94

Primary Examiner—Douglas W. Olms
Assistant Examiner—Frank M. Scutch, III
Attorney, Agent, or Firm—R. John Haley

[57] ABSTRACT

In a packet data transmission system, correctly received information packets are acknowledged by piggybacking their sequence numbers onto information packets being transmitted. The control field of each information packet includes a bit which indicates whether or not there is a piggybacked acknowledgement. Acknowledgements can also be transmitted separately in control packets having no information field. Each acknowledgement consists of not only the sequence number of a correctly received information packet, but also the acknowledgement status of a plurality of preceding information packets whereby these can be negatively acknowledged if necessary. The sequence numbers can have any one of three different sizes, for efficient transmission of sequence numbers on transmission links of arbitrary transmission speed and length (and hence delay). The sequence number size which is used on any particular transmission link is determined on set-up of the link in dependence upon the transmission speed and the round-trip delay of the link.

37 Claims, 5 Drawing Figures

TRANSMITTING SEQUENCE NUMBERS OF INFORMATION IN A PACKET DATA TRANSMISSION SYSTEM

This invention relates to packet data transmission systems, and is particularly concerned with methods of transmitting sequence numbers of information packets in such systems.

It is well known to provide a packet data transmission system in which information is transmitted in packets in accordance with a predetermined framing procedure. For example, HDLC (High Level Data Link Control) frames may be transmitted, each of which includes an opening flag having a predetermined unique form, control and information fields, a frame check (cyclic redundancy check) sequence, and a closing flag which is the same as the opening flag.

With increasing use of and demand for data transmission services, it is desirable to increase the throughput of packets transmitted via a packet data transmission system. This can be achieved by increasing the transmission speed on point-to-point transmission links, which may be satellite or terrestrial links. This measure, especially when using satellite transmission links involving long round-trip delays, drastically increases the number of packets which are "in flight", i.e. have been transmitted but for which an acknowledgement has not been received, at any instant.

It is known to acknowledge each information packet which is correctly received from the transmission link by sending back a sequence number of the received information packet, this constituting a positive acknowledgement (ACK) that this packet and all preceding packets have been correctly received. In addition, a negative acknowledgement (NAK) indicating that a packet has been incorrectly received can be returned so that the transmitting end is advised of any information packet which is unsuccessfully transmitted. Such a packet is subsequently retransmitted.

If the retransmitted packet has the sequence number of the original packet, this procedure is only effective if there is not more than one negatively acknowledged packet outstanding at any time. If more then one packet at any time is in error, the procedure fails and the transmission link must be reset, with retransmission of all packets which have not been acknowledged. If retransmitted packets are assigned new sequence numbers, the procedure fails if there are two consecutive information packets in error. As a packet may contain several thousand bits, an error in any one of which results in the frame check at the receiving end failing so that the packet must be discarded and negatively acknowledged so that it can be retransmitted, the packet error rate on a transmission link which is prone to errors can be very high. With a large number of packets in flight, such a transmission link would have to be frequently reset with the above procedure, rendering it very ineffective for data transmission.

Accordingly, a need exists for an improved control procedure or protocol for the transmission and acknowledgement of information packets in a packet data transmission system, which is particularly suitable for use with such systems having long round-trip delays and/or high transmission rates. Furthermore, such a procedure is desired to handle both short and long packets efficiently, and to accommodate unbalanced information rates for the two directions of transmission. At the same time, such a procedure is desirably usable efficiently on all transmission links of arbitrary speed and delay, so that a single procedure can be used consistently on many varied packet data transmission systems.

According to one aspect of this invention there is provided a method of transmitting sequence numbers of information packets in a packet data transmission system, each information packet comprising a control field and an information field, the control field of each information packet including a sequence number of the information packet, comprising the steps of selectively transmitting in said information packet the sequence number of an information packet received in an opposite direction of transmission thereby to acknowledge correct receipt of the received information packet, and transmitting in the control field of each information packet a bit whose state indicates the presence or absence in the information packet of the sequence number of received information packet being acknowledged.

Thus the sequence numbers of received information packets are selectively piggybacked onto information packets which are being transmitted, resulting in an efficient manner of acknowledging correctly received information packets.

The method preferably includes the step of transmitting with each sequence number of a received information packet being acknowledged an acknowledgement status of each of n information packets received preceding said received information packet being acknowledged, where n is a positive integer. This enables information packets which have been incorrectly received to be negatively acknowledged without specifying their sequence numbers (which may have been corrupted by a transmission error causing the incorrect reception of the packet). Preferably a plurality of successive information packets can be acknowledged in this way to provide a redundant but still efficient way of positively and negatively acknowledging received packets. Accordingly n is preferably greater then one and is, for example, 3.

Preferably control packets each including a control field and no information field are also transmitted in the system, and the control field of each packet includes a bit whose status indicates whether the packet is an information packet or a control packet. In this case conveniently the control field of each control packet further includes a bit whose state indicates whether or not the control field includes the sequence number of a received information packet being acknowledged. Thus correctly received information packets can be acknowledged by having their sequence numbers piggybacked onto information packets being transmitted, as recited above, or transmitted separately in control packets. Thus acknowledgements of packets can still be efficiently and redundantly transmitted even when there are considerable differences between the rates at which information packets may be being transmitted in the two directions of transmission.

Advantageously the control field of at least some, and conveniently all, of the control packets includes at least one length bit whose state indicates which one of a plurality of different lengths of sequence numbers (hereinafter referred to as sequence number sizes) is used, all of the sequence numbers used having the same size. Preferably there are at least two length bits for representing at least three different sizes of sequence numbers.

This feature results in the advantage that the sequence number size used on any particular packet data transmission link can be adaptively adjusted, on set-up of the link, to the transmission speed and round-trip delay of the link. Thus a short, slow link can have a small sequence number size for efficient transmission of sequence numbers, while long, fast links can have a large sequence number size to accommodate the large number of packets which may be flight at any instant.

To facilitate providing this feature, the method preferably includes the step of determining the sequence number size by measuring the round-trip delay D for transmission of a packet via the pack data transmission system, and determining the sequence number size in dependence upon the measured delay D and the transmission speed T of the system. The sequence number size is conveniently determined to be the smallest of said plurality of different sizes which can hold a number TD/B(T multiplied by D divided by B), where B is a predetermined integer. B is preferably an integral power of 2 for convenience, for example B=128, and actually represents a conservative or low value of the average number of bits per packet.

The round-trip delay D is conveniently measured by transmitting a first predetermined control packet, transmitting a second predetermined control packet in response to receipt of the first predetermined control packet from the far end, and timing the delay D from the transmission of the first predetermined control packet until receipt of the second predetermined control packet.

According to another aspect of this invention there is provided a method of transmitting sequence numbers of information packets in a packet data transmission system in which information packets and control packets are transmitted, each packet including a control field including a bit whose state indicates whether the packet is an information packet or a control packet, each information packet including an information field and including a sequence number of the information packet in its control field, the control field of at least some of the control packets including at least one length bit whose state indicates which one of a plurality of different sizes of sequence numbers is used, all of the sequence numbers having the same size, the method including the step of determining the sequence number size by measuring the round-trip delay D for transmission of a packet via the system and determining said size in dependence upon the measured delay D and the transmission speed T of the system.

According to a further aspect of this invention there is provided a method of transmitting sequence numbers of information packets in a packet data transmission system, each information packet comprising a control field and an information field, the control field of each information packet including a sequence number of the information packet, comprising the steps of transmitting in the information packets sequence numbers of information packets received in an opposite direction of tranission thereby to acknowledge correct receipt of the received information packets, and transmitting with each sequence number of a received information packet being acknowledged an acknowledgement status of each of n information packets received preceding said received information packet being acknowledged, where n is a positive integer.

The invention will be further understood from the following description of an embodiment thereof with reference to the accompanying drawings, in which:

FIG. 1 schematically illustrates transmission links between two nodes of a packet data transmission system;

Figure 1:
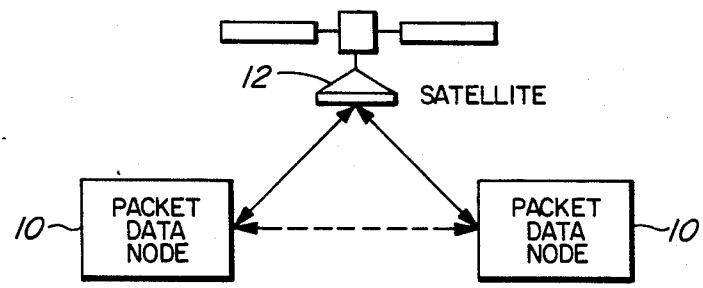

FIG. 1 shows two packet data nodes 10 of a two-level (datagram under a virtual circuit) packet data transmission system to which the invention is applicable. Transmission of packet data in both directions between the nodes 10 is effected via a satellite transmission link, via a satellite 12, as shown in solid lines or via a terrestrial transmission link as shown in broken lines. The bit rate on the transmission links may fall anywhere within a wide range, for example from 9600 b/s to 44 Mb/s, and the round-trip delay for transmission between the nodes may be from a few milliseconds for a short terrestrial transmission link to about 600 ms per hop for a satellite transmission link (i.e. more than 1 second for a two-hop satellite transmission link).

Figure 2:
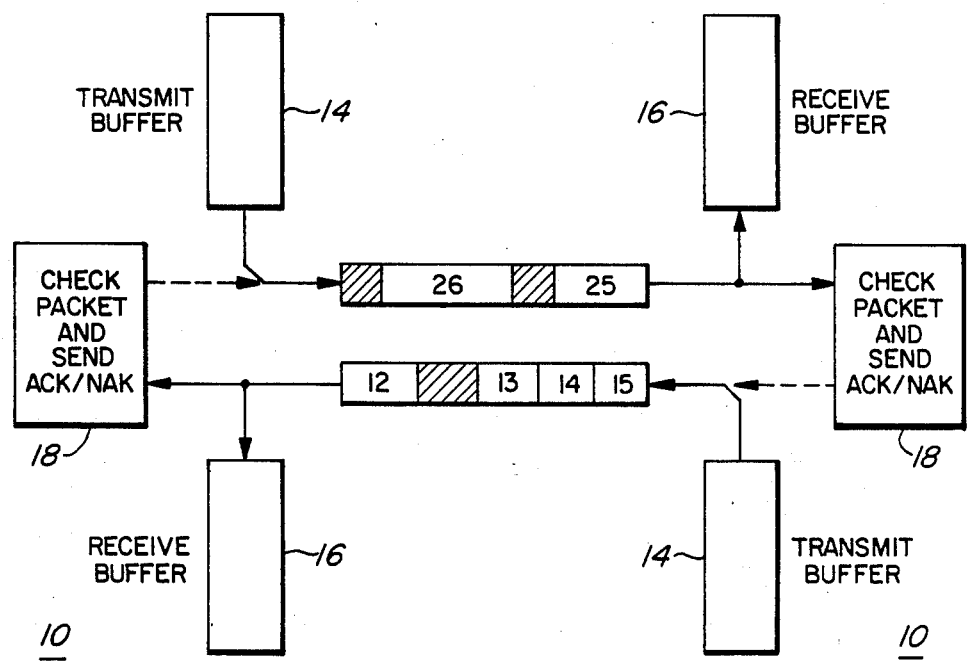
FIG. 2 illustrates parts of two packet data nodes and the transmission of data packets in both directions therebetween.

FIG. 2 shows parts of each node 10, and illustrates the transmission of information packets in the two directions on the transmission link. Each node 10 includes transmit and receive packet buffers 14 and 16 respectively, and processing means 18 for cyclic redundancy checking of the received packets and sending a positive acknowledgement ACK in response to each each correctly received information packet. If a received information packet contains an error it is discarded and a negative acknowledgement NAK is subsequently transmitted in respect of the incorrect packet. The manner in which such acknowledgements are transmitted is described in detail below. To facilitate identifying packets for such acknowledgements, each information packet has an assigned sequence number, the sequence numbers being independent for the two transmission directions. FIG. 2 illustrates by way of example information packets having sequence numbers 25 and 26 being transmitted in one direction, and information packets having sequence numbers 12 to 15 being transmitted in the opposite direction, on the transmission link, the packets having arbitrary and varying lengths.

Each packet is transmitted on the transmission link in the form of a serial bit sequence forming a frame. The frame format is illustrated in FIG. 3.

Figure 3:
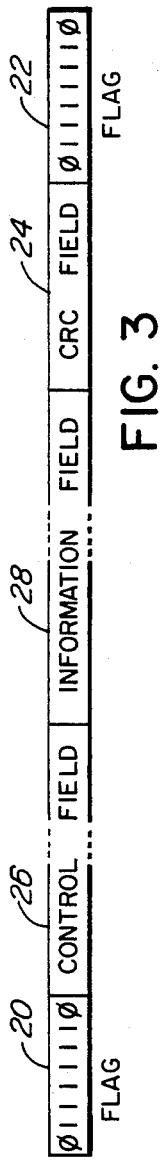
FIG. 3 illustrates the framing format of the packets.

As shown in FIG. 3, each frame is similar to an HDLC frame in that it is defined by an opening flag 20 and a closing flag 22, each of which is constituted by the 8-bit sequence 01111110 which does not occur in the frame between the flags. The closing flag 22 is immediately preceded by a 16-bit cyclic redundancy check sequence 24, which is produced and serves in known manner to enable errors in transmission of the frame to be detected at the receiving end of the transmission link. The opening flag 20 is followed by a control field 26 which is described in detail below. Except in the case of control packets as described below, the control field 26 is followed by an information field 28 comprising the information which is intended to be transmitted by the packet.

In the following description the control fields 26 and information fields 28 are both assumed to have lengths which are multiples of 8 bits, an 8-bit sequence being referred to below for convenience as a byte. These fields, and each of the other fields of each packet, may generally, however, have lengths which need not be multiples of 8 bits. The information field 28, in particular, may have any arbitrary number of bits within the limits imposed by a maximum packet size. In this embodiment of the invention, each control field comprises from 1 to 6 bytes, as described below with reference to FIGS. 4 and 5.

Figure 4:
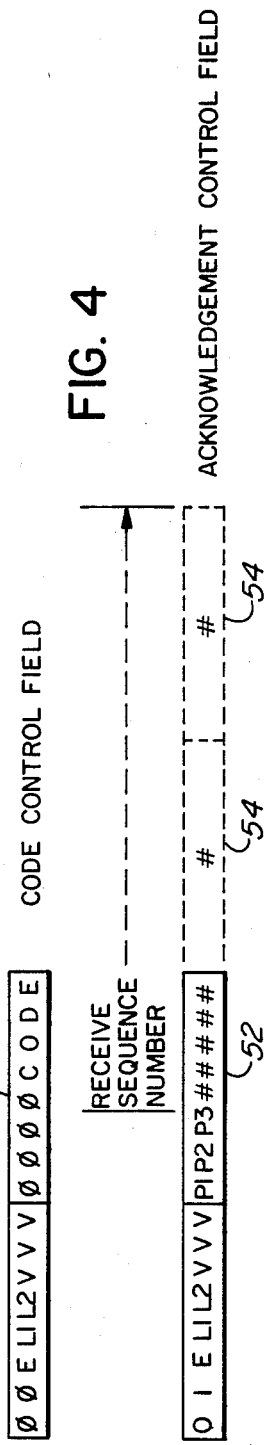
FIG. 4 illustrates different forms of the control field of control packets.
Figure 5:
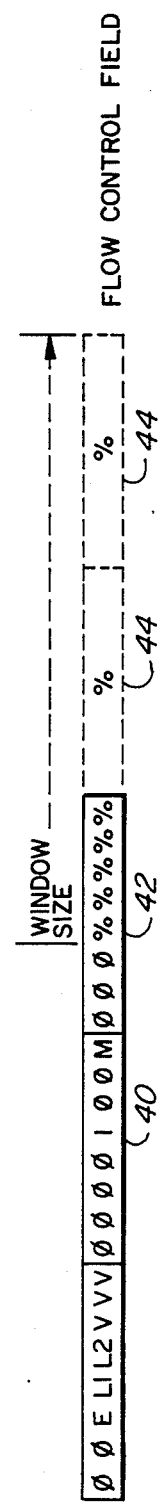
FIG. 5 illustrates different forms of the control field of information packets.
Figure 5:
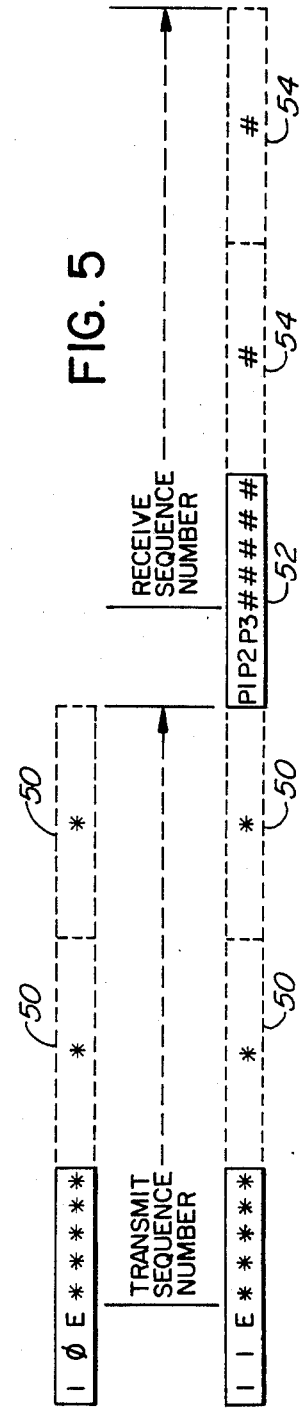

FIG. 4 shows control fields 26 of control packets, which have no information field 28. A control packet is distinguished in that the first bit, as illustrated in FIGS. 4 and 5, of the first byte of the control field is 0. Conversely, FIG. 5 shows control fields 26 of information packets, which have information fields 28 of arbitrary length following the control fields as shown in FIG. 3. The first bit, as illustrated in FIG. 5, of the first byte of each information packet control field is 1. Although reference is made here to a particular order of bits within each byte of the control fields, it should be understood that this order is chosen for descriptive convenience, and the actual order of bits within the bytes can be different from this to facilitate processing of the control fields.

Before describing the control fields of the control and information packets in further detail, it is expedient to describe a feature of the invention relating to the sequence numbers of the transmitted packets.

As already described, for each transmission direction, each information packet is assigned a sequence number. This sequence number is transmitted as part of the control field of the information packet, and the sequence numbers are cyclically re-used. As each packet must be uniquely identifiable, so that it can be retransmitted (with a new sequence number) if it is received with an error, there must be more sequence numbers than there are packets in flight. The size of the sequence number (i.e. the number of bits required to represent the sequence number) thus depends on the size of the packets, the transmission rate, and the round-trip delay on the transmission link. Clearly, the sequence number size must be much bigger for a high speed satellite transmission link transmitting short packets, on which there are many packets in flight at any instant, than for a short low speed terrestrial transmission link on which very few packets will be in flight at any instant.

Whilst it would be possible to determine the sequence number size based on the largest sequence number needed for a high speed multiple-hop satellite transmission link transmitting short packets, and to use this sequence number size for all transmission links, this would be inefficient for the majority of cases involving lower transmission rates, shorter round-trip delays, and/or longer packets. In accordance with this invention, therefore, a variable sequence number size is used, determined for any individual transmission link in the manner described below on set-up of the link.

In this embodiment, the sequence number is either 5, 13, or 21 bits long, depending on the particular transmission link over which it is used. Thus for a short, low-speed transmission link, a 5-bit sequence number is transmitted in 5 bits of one byte of the control field of each information packet. For increasingly faster and longer (greater round-trip delay) transmission links, these 5 bits are supplemented by the 8 bits of one or two additional bytes of the control field, depending on the largest sequence number required.

Referring again to FIG. 5, which shows two possible forms of the control field 26 of an information packet, the packet sequence number is identified by asterisks occupying the last 5 bit positions of the first byte of the control field, corresponding to the minimum 5-bit size of the sequence number. The control field 26 is optionally supplemented with one or two further bytes 50, each of which serves to extend the sequence number size by a further 8 bits (to 13 or 21 bits respectively) to accommodate the larger sequence numbers discussed above. As these further bytes are provided selectively on the basis of need, they are shown in broken lines in FIG. 5, the contents of each byte being indicated by a single asterisk for each byte.

The remaining, second and third as illustrated, bits of the first byte of the control field of each information bit are constituted respectively by a type bit, which is either 0 or 1 as illustrated and whose function is explained below, and an extension bit E which is reserved for future extensions and which is not used in this embodiment. For example, the extension bit E could be used to indicate the presence at the end of the control field 26 of an additional field carrying address information for multipoint trunks on a local area network.

In general, correctly received packets are acknowledged by each node by piggybacking the acknowledgements onto the control fields of information packets which are being transmitted. However, this piggybacking is effected selectively to provide for efficient transmission of acknowledgements between the nodes. The type bit in the first byte of the control field of each information packet serves to indicate whether or not an acknowledgement is piggybacked onto the control field. In the upper diagram in FIG. 5, there is no piggybacked acknowledgement and this type bit (the second bit as shown) is 0. Such a situation will occur when, for example, a node is transmitting more information packets than it is receiving, so that not all of the information packets being transmitted need to carry acknowledgements. In the lower diagram in FIG. 5, the type bit is 1 and an acknowledgement, comprising at least one byte 52 and possibly 1 or 2 further bytes 54, is piggybacked onto the control field.

The byte 52 comprises three bits P1, P2, and P3 which are discussed below, and 5 bits marked # which constitute at least part of the sequence number of the received packet being acknowledged. This is a different number from the transmit sequence number contained earlier in the control field and which represents the sequence number of the information packet which is being tansmitted, in view of the independent sequence numbering in the two directions of transmission. However, the size of the sequence number, namely 5, 13, or 21 bits with respectively 0, 1, or 2 further bytes 54, is determined in exactly the same manner as the size of the transmit sequence number. Thus in a piggybacked control field 26 of an information packet there are either 2 bytes with a sequence number size of 5 bits for each direction, or 4 bytes with a sequence number size of 13 bits for each direction, or 6 bytes with a sequence number size of 21 bits for each direction.

As any packet which is received with any bit in error is discarded, the sequence numbers of any packets which are to be negatively acknowledged are not known. The receive sequence number in the piggybacked control field is, therefore, a positive acknowledgement of the receipt of the relevant packet. The three bits P1, P2, and P3 in the byte 52 represent the acknowledgement status of the three packets received immediately preceding the received packet whose sequence number is being sent; each of these bits is 0 to constitute a positive acknowledgement ACK or 1 to represent a negative acknowledgement NAK for the respective packet. It follows that up to 3 consecutive packets can be in error without the transmission link having to be reset.

If a node is receiving more information packets than it is transmitting, then even piggybacking an acknowledgement onto the control field of each trasnmitted information packet may be insufficient to acknowledge all received information packets. (It is noted, however, that using the bits P1, P2, and P3 information packets which have been correctly received can conceivably be positively acknowledged without sending their receive sequence numbers). In this case, the node can separately acknowledge received packets by transmitting control packets each of which has a control field 26 (and no information field 28) which has the form shown in the middle diagram of FIG. 4, referred to as an acknowledgement control field.

As already explained, the first bit (as illustrated) of the first byte of the control field of a control packet is 0, representing that this is a control packet having no information field 28. The second bit (as illustrated) is a type bit which is 1, as shown in the middle diagram of FIG. 5, for an acknowledgement control field and is 0, as shown in the upper and lower diagrams of FIG. 5, for other control packets which are discussed further below. The third bit is an extension bit E which is reserved for future extension purposes. This is unused in this embodiment, but for example could be used in acknowledgement control fields to indicate the presence of multiple acknowledgements in a single control packet. The fourth and fifth bits L1 and L2 are length bits which relate to the size of the sequence numbers; these are discussed further below. The remaining 3 bits of the first byte of the control field are version bits V, which represent a version number of the protocol and in this case are all 0.

The first byte of an acknowledgement control field (type bit=1) is followed by 1, 2, or 3 acknowledgement bytes which are formed in exactly the same manner as the bytes 52 and 54 described above, and are accordingly given the same references in the middle diagram of FIG. 4. The first byte of other control fields of control packets, referred to as code control fields, is followed by a byte 40 (which may be followed by other bytes, depending on the code) which contains four 0 bits which are not used in this embodiment but are reserved for future extensions, followed by a 4-bit control code. The following table lists in order of decreasing precedence various control codes which are used in this embodiment of the invention. It is noted that a code of four 0 bits is deemed illegal and is not used, and that other control codes not listed here may be defined.

| Code | Name |
|------|------|
| 0011 | UP |
| 0100 | READY |
| 0001 | DMP (Delay Measurement Probe) |
| 0010 | DMR (Dely Measurement Response) |
| 1100 | LCC (Length Check Command) |
| 1101 | LCR (Length Check Response) |
| 0101 | AYT (Are You There?) |

-continued

| Code | Name |
|------|------|
| 0110 | YIA (Yes, I Am) |
| 1000 | FCC (Flow Control Command) |
| 1001 | FCR (Flow Control Response) |

The upper diagram in FIG. 4 shows a general form of the code control field. The lower diagram of FIG. 4 shows a flow control field in which the 4-bit control code in the second byte of the field is 100 M, where as shown by the above table M is 0 for the command and 1 for the response. For this field, this second byte 40 is followed by 1, 2, or 3 further bytes 42, 44, depending on the sequence number size in the same manner as already explained. The first further byte 42 contains three 0 bits which are unused, followed by a 5-bit (which may be extended to 13 or 21 bits by the addition of the further bytes 44) window size which is represented by the symbol %. The window size is the maximum number of packets which are allowed to be in flight, i.e. transmitted but not yet acknowledged, in the relevant transmission direction at any instant. One or both of the further bytes 44 are provided or not, as the case may be, depending on whether or not the further bytes 50 and 54 are provided for the particular transmission link.

Having described the form of the control fields, the manner in which the transmission link is set up and the sequence number size for the link is determined during this set-up is described below.

The length bits L1 and L2 are present in the first byte of the control field of each control packet, but need not necessarily be checked in each packet. These bits have the values 01, 10, or 11 (the values 00 are not valid) to represent that the sequence numbers and window sizes are respectively short (i.e. no bytes 50, 54, and 44 are present), extended (i.e. 1 byte 50, 54, or 44 is added in each case), or long (i.e. 2 bytes 50, 54, or 44 are added in each case). As initially the required sequence number size is not known, at the start of the set-up procedure described below the length bits are both set to 1 (long) so that the largest sequence number size is initially used.

For set-up, each node initially measures the transmission speed of the transmission link in known manner, and subsequently transmits control packets with the UP control code. On receipt of an UP control code packet, each node resets its transmission link control if this has not already been done during its own self-testing, and transmits READY control code packets. Receipt of a READY control code packet from the far end means that both nodes are then ready to perform a round-trip transmission link delay measurement.

For the delay measurement, each node transmits a DMP control code packet, and times the delay until a DMR control code packet is received. In response to receipt of a DMP control code packet, each node returns a DMR control code packet as quickly as possible. A time-out period of 1.5 seconds is allowed within which to receive the returned DMR control code packet. Each node then determines a field number F from the equation F=TD/B(F is equal to T multiplied by D divided by B) where T is the measured transmission speed in bits/second, D is the measured round-trip delay in seconds, and B is a conservative (i.e. low) value of the number of bits per packet. B is a predetermined integer, selected to be an integral power of 2 for convenience, and for example is selected to be 128.

The field number F is used to determine new values for the length bits L1 and L2. If F is not greater than 32, short sequence numbers (5 bits, $2^5=32$) are used and the length bits L1, L2 are set to 01. If F is greater than 32 but not greater than 8192, extended sequence numbers (13 bits, $2^{13}=8192$) are used and the length bits L1, L2 are set to 10. If F is greater than 8192, long sequence numbers (21 bits) are used and the length bits L1, L2 remain 11.

After each node has determined the length bits L1 and L2 in this manner, it transmits LCC control code packets using the new length bits until it receives an LCR control code packet, in which it checks that the received length bits are the same as those transmitted. In response to an LCC control code packet, it transmits an LCR control code packet using its determined length bits. Thus a length bit check is carried out to ensure that the nodes determine the same length bits. If this check fails, the delay is remeasured by each node and the above process is repeated. After a repeated number of length check failures, the larger sequence number size is adopted.

Finally, the set-up procedure is completed by each node setting the P1, P2, and P3 bits to 0, representing positive acknowledgements which, when they are received by the far end node, have no effect because the node's transmit buffer is empty at this time.

During operation, transient errors may occur which cause a node to stop transmitting information packets and instead to transmit AYT control code packets. On receipt of an AYT control code packet, a node responds with a YIA control code packet. If the first node receives a YIA control code packet in response, it checks the length bits LI and L2 in the received YIA code control field, restarts its transmit sequence numbering, and retransmits all unacknowledged packets. The traffic flow in the opposite direction is unaffected. If no YIA control code packet is received within a time-out period, which is for example 0.3 seconds greater than the measured round-trip delay, then the above set-up procedure is repeated.

Although a particular embodiment of the invention has been described in detail, it should be understood that numerous modifications, variations, and adaptations may be made thereto without departing from the scope of the invention as defined by the claims.

What is claimed is:

1. A method of transmitting sequence numbers of information packets in a packet data transmission system, each information packet comprising a control field and an information field, the control field of each information packet including a sequence number of the information packet, comprising the steps of selectively transmitting in said information packet the sequence number of an information packet received in an opposite direction of transmission thereby to acknowledge correct receipt of the received information packet, and transmitting in the control field of each information packet a bit whose state indicates the presence or absence in the information packet of the sequence number of a received information packet being acknowledged.

2. A method as claimed in claim 1 and including the step of transmitting with each sequence number of a received information packet being acknowledged an acknowledgement status of each of n information packets received preceding said received information packet being acknowledged, where n is a positive integer.

3. A method as claimed in claim 2 wherein n is greater than one.

4. A method as claimed in claim 2 wherein $n=3$.

5. A method as claimed in claim 1 wherein each information packet which includes a sequence number of a received information packet being acknowledged includes said sequence number at the end of the control field and before the information field of the information packet.

6. A method as claimed in claim 1 wherein control packets each including a control field and no information field are also transmitted in said system, wherein the control field of each packet includes a bit whose state indicates whether the packet is an information packet or a control packet.

7. A method as claimed in claim 6 wherein the control field of each control packet further includes a bit whose state indicates whether or not the control field includes the sequence number of a received information packet being acknowledged.

8. A method as claimed in claim 7 and including the step of transmitting with each sequence number of a received information packet being acknowledged an acknowledgement status of each of n information packets received preceding said received information packet being acknowledged, where n is a positive integer.

9. A method as claimed in claim 8 where $n=3$.

10. A method as claimed in claim 7 wherein the control field of at least some of the control packets includes at least one length bit whose state indicates which one of a plurality of different lengths of sequence numbers is used, all of the sequence numbers used having the same length.

11. A method as claimed in claim 10 wherein there are at least two length bits for representing at least three different lengths of sequence numbers.

12. A method as claimed in claim 11 wherein the control field of each control packet includes said length bits.

13. A method as claimed in claim 10 wherein the sequence number lengths differ from one another by 8 bits.

14. A method as claimed in claim 10 and including the step of determining the sequence number length by measuring the round-trip delay D for transmission of a packet via the packet data transmission system, and determining the sequence number length in dependence upon the measured delay D and the transmission speed T of the system.

15. A method as claimed in claim 14 wherein the sequence number length is determined to be the smallest of said plurality of different lengths which can hold a nunber TD/B, where B is a predetermined integer.

16. A method as claimed in claim 15 wherein B is an integral power of 2.

17. A method as claimed in claim 16 wherein $B=128$.

18. A method as claimed in claim 14 wherein the round-trip delay D is measured by transmitting a first predetermined control packet, transmitting a second predetermined control packet in response to receipt of the first predetermined control packet, and timing the delay D from the transmission of the first predetermined control packet until receipt of the second predetermined control packet.

19. A method of transmitting sequence numbers of information packets in a packet data transmission system in which information packets and control packets are transmitted, each packet including a control field including a bit whose state indicates whether the packet is an information packet or a control packet, each information packet including an information field and including a sequence number of the information packet in its control field, the control field of at least some of the control packets including at least one length bit whose state indicates which one of a plurality of different lengths of sequence numbers is used, all of the sequence numbers used having the same length, the method including the step of determining the sequence number length by measuring the round-trip delay D for transmission of a packet via the system and determining said length in dependence upon the measured delay D and the transmission speed T of the system.

20. A method as claimed in claim 19 wherein there are at least two length bits for representing at least three different lengths of sequence numbers.

21. A method as claimed in claim 20 wherein the control field of each control packet includes said length bits.

22. A method as claimed in claim 21 wherein the sequence number lengths differ from one another by 8 bits.

23. A method as claimed in claim 19 wherein the sequence number is determined to be the smallest of said plurality of different lengths which can hold a number TD/B, where B is a predetermined integer.

24. A method as claimed in claim 23 wherein B is an integral power of 2.

25. A method as claimed in claim 24 wherein B=128.

26. A method as claimed in claim 19 wherein the round-trip delay D is measured by transmitting a first predetermined control packet, transmitting a second predetermined control packet in response to receipt of the first predetermined control packet, and timing the delay D from the transmission of the first predetermined control packet until receipt of the second predetermined control packet.

27. A method of transmitting sequence numbers of information packets in a packet data transmission system, each information packet comprising a control field and an information field, the control field of each information packet including a sequence number of the information packet, comprising the steps of transmitting in the information packets sequence numbers of information packets received in an opposite direction of transmission thereby to acknowledge correct receipt of the received information packets, and transmitting with each sequence number of a received information packet being acknowledged an acknowledgement status of each of n information packets received preceding said received information packet being acknowledged, where n is a positive integer.

28. A method as claimed in claim 27 wherein n is greater than one.

29. A method as claimed in claim 28 wherein n=3.

30. A method as claimed in claim 27 wherein each information packet which includes a sequence number of a received information packet being acknowledged includes said sequence number at the end of the control field and before the information field of the information packet.

31. A method as claimed in claim 27 wherein control packets each including a control field and no information field are also transmitted in said system, wherein the control field of each packet includes a bit whose state indicates whether the packet is an information packet or a control packet.

32. A method as claimed in claim 31 wherein the control field of each control packet further includes a bit whose state indicates whether or not the control field includes the sequence number of a received information packet being acknowledged.

33. A method as claimed in claim 32 wherein the control field of at least some of the control packets includes at least one length bit whose state indicates which one of a plurality of different lengths of sequence numbers is used, all of the sequence numbers used having the same length.

34. A method as claimed in claim 33 wherein there are at least two length bits for representing at least three different lengths of sequence numbers.

35. A method as claimed in claim 34 wherein the control field of each control packet includes said length bits.

36. A method as claimed in claim 33 and including the step of determining the sequence number size by measuring the round-trip delay D for transmission of a packet via the packet data transmission system, and determining the sequence number length in dependence upon the measured delay D and the transmission speed T of the system.

37. A method as claimed in claim 36 wherein the round-trip delay D is measured by transmitting a first predetermined control packet, transmitting a second predetermined control packet in response to receipt of the first predetermined control packet, and timing the delay D from the transmission of the first predetermined control packet until receipt of the second predetermined control packet.

* * * * *